No. 877,793. PATENTED JAN. 28, 1908.
C. MURPHY.
FISH HOOK ATTACHMENT.
APPLICATION FILED APR. 24, 1907.
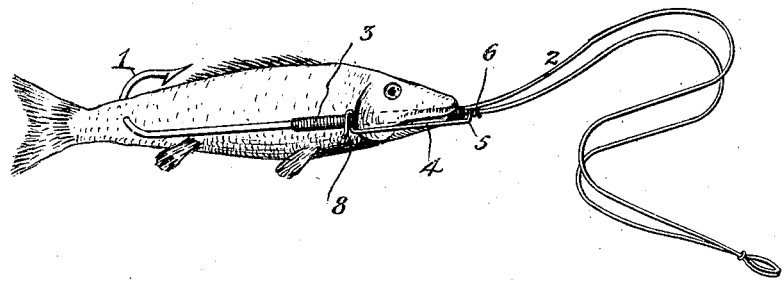
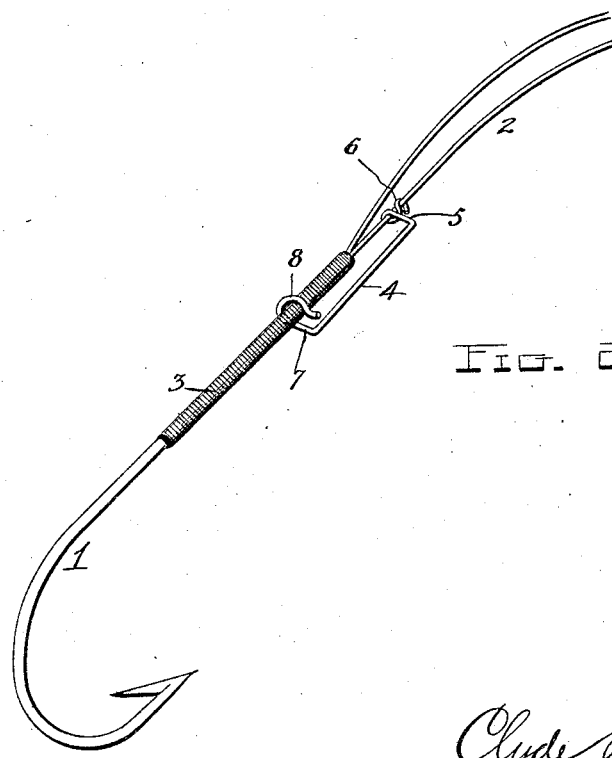

UNITED STATES PATENT OFFICE.

CLYDE MURPHY, OF KINGMAN, KANSAS.

FISH-HOOK ATTACHMENT.

No. 877,793.  Specification of Letters Patent.  Patented Jan. 28, 1908.

Application filed April 24, 1907. Serial No. 370,104.

*To all whom it may concern:*

Be it known that I, CLYDE MURPHY, a citizen of the United States, residing at Kingman, in the county of Kingman and State of Kansas, have invented certain new and useful Improvements in Fish-Hook Attachments, of which the following is a specification, reference being had therein to the accompanying drawing.

My invention relates to improvements in fish hooks and more particularly to means for retaining bait upon the same.

One object of the invention is to provide a simple, practical and inexpensive device which will not only retain the bait upon the hook but also hold bait, such as a minnow, straight or in a position parallel with the hook, even after it is dead.

Another object of the invention is to provide a device of this character in the form of an attachment which may be readily applied to fish hooks having the usual snoods, or connected with a fish line in the usual manner where snoods are not employed.

With the above and other objects in view the invention consists in the features of novelty hereinafter described and claimed and illustrated in the accompanying drawings, in which Figure 1 is a perspective view illustrating the application of the invention; and Fig. 2 is a detailed perspective of the hook and the attachment on an enlarged scale.

The preferred embodiment of my invention illustrated in the accompanying drawings is in the form of an attachment specially designed for use upon a fish hook 1 of usual form having a snood 2 secured by the usual wrapping 3 to the end of the straight body portion of the hook.

The attachment is denoted by the number 4 and is preferably constructed of a small piece of resilient wire having one of its ends 5 bent substantially at right angles and coiled as shown at 6 around one or both of the branches of the snood. Its other end 7 is bent at right angles and then into a laterally or transversely projecting hook 8 adapted to spring over the body portion of the hook or the wrapping 3 as clearly shown in Fig. 1. By coiling one end of the attachment around one or both branches of the snood it is securely fastened to the latter and at the same time permitted to slide and turn upon it, its downwardly sliding movement being limited, of course, by the engagement of the coil with the hook.

In using the invention for holding a minnow or other live bait upon the hook as shown in Fig. 1, the hook is inserted in the mouth of the minnow and then passed out of one of its gills and then passed through its body adjacent to its tail. The attachment 4 is then moved down upon the snood until its coil 6 engages the mouth of the fish or the end of the wrapping 3 and the hook shaped free end 8 of the attachment is then engaged with the hook 1 or its wrapping just in rear of the gill of the minnow as clearly shown in Fig. 1. It will be seen that when the device is thus applied it will prevent the minnow from doubling up and slipping down upon the hook and will maintain it in a straight position and parallel with the hook and the line. It will be further noted that the device is exceedingly effective in accomplishing its purpose and that it may be quickly and easily applied.

While I have shown and described the preferred embodiment of my invention it will be understood that I do not limit myself to the precise showing set forth since various changes in the form, proportion and minor details of construction may be resorted to without departing from the spirit or sacrificing any of the advantages of the invention.

Having thus described my invention what I claim as new and desire to secure by Letters Patent is:

1. A fish hook having a resilient bait retaining member adapted to extend over a portion of the bait and having one of its ends formed with a laterally or transversely disposed hook shaped portion to engage the fish hook, substantially as described.

2. A fish hook having a bait retaining member slidably engaged at one end with the line engaging portion of the hook and having at its other end a hook shaped portion to engage the body of the hook.

3. The combination with a fish hook having a snood, of a bait retaining member having one end connected to the snood and its other end formed with a transverse or laterally projecting hook shaped portion to engage the body of the hook.

4. The combination with a fish hook having a snood, of a bait retaining member having one end slidably engaged with the snood and its other end adapted for engagement with the body of the hook.

5. The combination with a fish hook having a snood, of a bait retaining member having one of its ends bent around the snood and its other end bent to provide a hook shaped portion to engage the body of the hook.

In testimony whereof I hereunto affix my signature in presence of two witnesses.

CLYDE MURPHY.

Witnesses:
W. S. EVANS,
OREN MURPHY.